Nov. 30, 1971  J. ATZMÜLLER  3,623,415
LENS MOUNT FOR A CAMERA
Filed Oct. 7, 1968  3 Sheets-Sheet 1
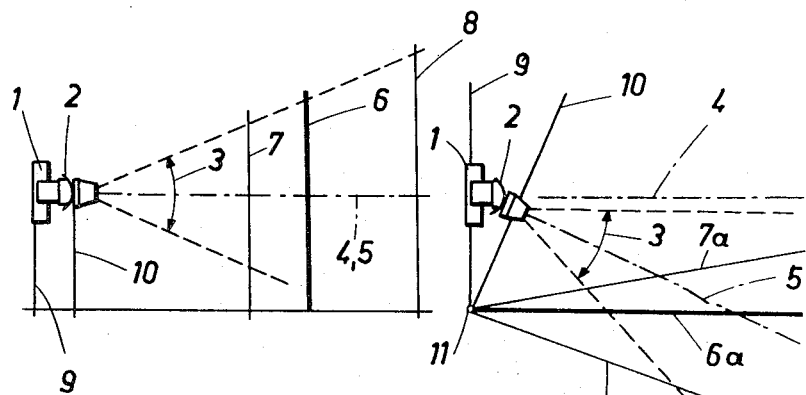
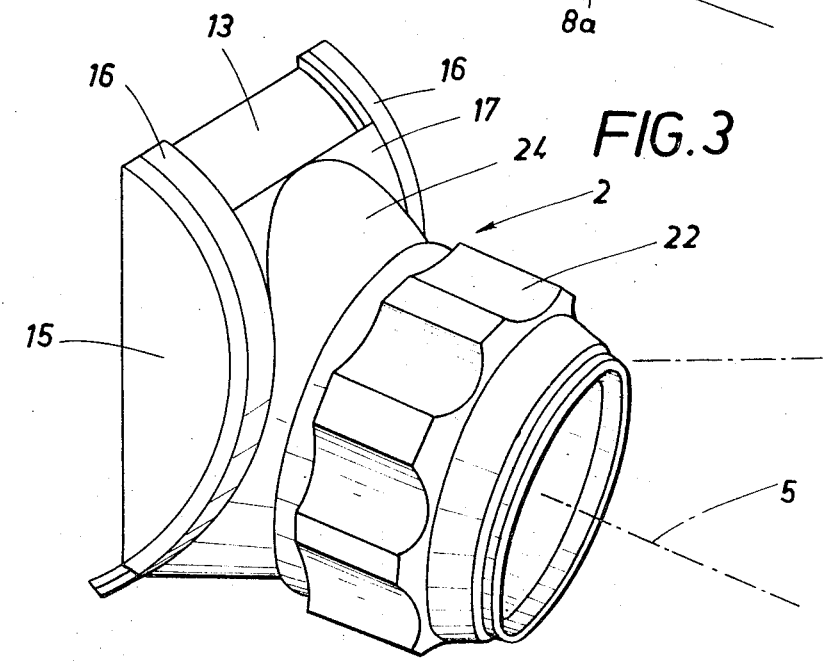
INVENTOR
JOSEF ATZMÜLLER
BY Kurt Kelman
AGENT Nov. 30, 1971   J. ATZMÜLLER   3,623,415
LENS MOUNT FOR A CAMERA
Filed Oct. 7, 1968   3 Sheets-Sheet 2

INVENTOR
JOSEF ATZMÜLLER
BY Kurt Kelman
AGENT

United States Patent Office 3,623,415
Patented Nov. 30, 1971

1

3,623,415
LENS MOUNT FOR A CAMERA
Josef Atzmüller, Berggasse 39, Linz, Austria
Filed Oct. 7, 1968, Ser. No. 765,412
Int. Cl. G03b 5/06
U.S. Cl. 95—50                                    3 Claims

ABSTRACT OF THE DISCLOSURE

A mounting connects a lens to a lens holder so as to enable a tilting of said lens into a range of positions in which Scheimpflug's rule can be utilized in taking a photograph. The mounting comprises a lens mount carrying the lens, a mounting member connected to the lens mount, a connecting member connected to the lens holder, and an articulated joint connecting the connecting member to the mounting member for pivotal movement on a pivotal axis which intersects the pivotal axis of the camera within the joint, the articulated joint being adapted to be fixed in position.

---

This invention relates to a novel mounting for a pivotal connection of a lens to a single-eyed reflex camera.

Cameras of this kind are normally provided with a hinged mirror or in exceptional cases with a semi-transparent mirror and are usually designed for miniature or medium size photographs not exceeding 60 x 60 millimeters. In the known cameras of that kind, a tilting of the lens has been enabled only in special cases and has required attachments. In most cases, tiltable lenses are mounted on a bellows attachment, which is connected to the camera and carries a mounting for an interchangeable lens. Such bellows attachments enable only very small tilting movements of the lens. Lenses are mainly tilted to effect a compensation so as to prevent so-called converging verticals in the picture. A bellows attachment has the severe disadvantage that it is relatively expensive and is complicated in operation and increases in any case the distance from the lens to the film plane so that the lens is focused to a near zone virtually by necessity and must be stopped down to a large extent when a sharply defined image of remote objects is desired.

A larger tilting movement of the lens relative to the optical axis of the camera, which axis is normal to the image plane, has been provided for so far virtually only in large-size cameras, which comprise a bellows and in most cases interchangeable camera fronts. These cameras enable in virtually all cases a satisfactory compensation of converging verticals as well as, by a utilization of Scheimpflug's rule, a considerable increase of the depth of field so that a proper selection of the location or attitude of the camera will result in photographs having a satisfactory sharpness from the near range to infinity. These cameras are focused with the aid of a focusing screen, which extends in the image plane of the camera.

It is an object of the invention to provide a simple lens mount which can easily be handled and which enables the increase of the depth of field enabled by the use of Scheimpflug's rule also in single-eyed reflex cameras.

The invention resides essentially in that a tilting of the lens into a range in which Scheimpflug's rule can be used in taking a photograph is enabled in that a mounting

2 member provided with a lens mount is connected to a connecting ring or a connecting bayonet member by an articulated joint, which can be locked and has a pivotal axis which intersects the optical axis of the camera within the joint, said connecting ring or connecting bayonet member is adapted to be secured to the lens holder of the camera, and the mounting member which carries the lens mount preferably comprises a tube, which surrounds the lens and which is adjustable in unison with the lens relative to the articulated joint in the direction of the axis of the lens.

To avoid a vignetting of the mirror of the camera, a tilting of the lens will be enabled in most cases only to the left or right or in an upward direction. Because the axis of the articulated joint intersects the optical axis of the camera within the articulated joint, virtually between the plane of the pivotal axis and film plane, the distance from the lens to the camera need not be increased or must be increased only to a small extent compared to the use of a normal mounting. The tube which is preferably provided enables an adjustment within a large range to meet various requirements arising when the lens has been tilted. Besides, the adjustment is simplified because the means for adjusting the lens are accessible only with difficulty even when such means are provided in the lens mount.

According to another feature of the invention, the mounting is connected to the connecting ring or the like so as to be rotatable about the optical axis of the camera at least within a predetermined angular range. Even if the lens is tiltable only about one axis, this feature enables an orientation of the lens axis to pass through any point of the spherical sector that is defined by the respective angular ranges of the tilting and rotational movements.

According to another feature of the invention, the articulated joint comprises two interengaging cylindrical shells and the shell that is connected to the lens mount has on its side facing the lens a circular aperture whereas a registering aperture of the second shell is elongated to accommodate the tilting movement. The use of cylindrical shells in the articulated joint results in a stable structure, which can be rendered lighttight with simple means. It is obviously possible within the scope of the invention to provide an articulated joint which consists of two spherical shells. In this case the shell which is adjacent to the lens has a smaller light passage aperture, which conforms to the lens mount, whereas the second shell has a correspondingly larger aperture, which is semicircular or circular to enable a tilting in all directions. In this design too the point about which the lens is tiltable can be adjusted to lie closely ahead of the camera or even in the image plane of the camera.

In a design which has proved satisfactory in practice, the curved edges of the cylindrical shell which is connected to the lens mount is held by guide strips which are secured to the other cylindrical shell. The articulated joint may be adapted to be fixed in position or at least the most significant tilted positions or ranges thereof may be marked by stops, detents, scales or the like. It will be understood that the normal position of the lens, in which the lens axis is aligned with the optical axis of the camera, will be exactly marked.

In a different embodiment, the mounting member is provided with two cross-pins, which protrude from opposite sides and engage bearing eyes or the like, at least one of said cross-pins is adapted to be clamped in the associated bearing eye, the mounting member is disposed within an aperture which is larger in diameter than the outside diameter of the mounting member and formed in a mounting ring that is connected to the connecting ring, and the annular clearance between the mounting member and the rim of the aperture in the retaining ring is lighttightly closed by a resilient diaphragm, sleeve or the like. In this arrangement, additional adjustment will be enabled if the mounting ring is mounted on a support which is connected to the connecting ring, the mounting ring is movable relative to said support at least in one direction at right angles to the axis of the aperture of the mounting ring and can be locked in different displaced positions, and the support is formed with an aperture which is elongated to accommodate the desired displacement.

The subject matter of the invention is shown by way of example in the drawing, in which FIGS. 1 and 2 are diagrammatic views showing a camera with the lens in a normal position and in a tilted position, in order to facilitate the understanding of the invention.

FIGS. 3 and 4 are a prespective view and a longitudinal sectional view showing a mounting according to the invention.

Figure 4:
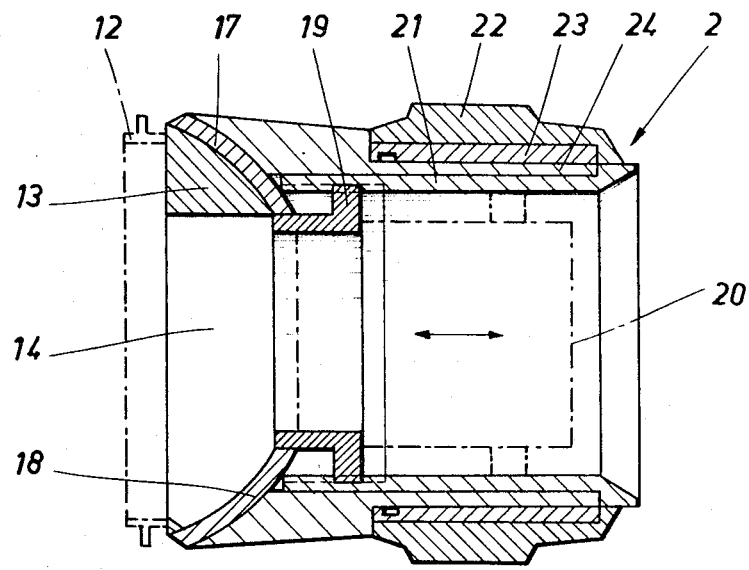

According to FIGS. 1 and 2, a lens having a predetermined angular coverage 3 is tiltably connected to a camera 1 by means of a mounting 2. When the lens in FIG. 1 is in its normal position, the main axis 4 of the camera and the axis 5 of the lens are aligned. When the lens is fully open and focused to a predetermined distance, sharply defined images of all points lying in the so-called focal plane 6 will be obtained and the points disposed between 7, 8 will still be within the zone of sharpness, whereas sharp images will not be formed of all points which lie before the plane 7 or behind the plane 8. The diaphragm or main plane 10 of the lens is parallel to the image plane 9 of the camera.

With reference to FIG. 2 Scheimpflug's rule says that a tilting of the lens will shift the focal plane 6a from an attitude in which it is normal to the image plane 9, as shown in FIG. 1, to an attitude in which the focal plane is parallel to the image plane. In this case, the focal plane is parallel to the axis 4 and the distance from the axis is defined by the line of intersection of planes 9, 10 at the so-called imaginary point 11. The larger the angle about which the lens is tilted relative to the axis 4, the closer will plane 6a be to the axis 4. The planes 7a, 8a which define the zone of sharpness extend also from the imaginary point.

To enable such a tilting of the lens, a mounting as shown in FIGS. 3 and 4 is provided. In normal medium-size reflex cameras, the lens can be tilted to one side only through about 24° because otherwise only part of the picture area would be exposed.

The mounting shown in FIGS. 3 and 4, comprises a cylindrical shell 13, which is provided with a connecting ring or a bayonet member 12 for the interchangeable attachment to a lens holder of the camera. The shell 13 is formed with an elongated light passage aperture 14 and at both ends carries end plates 15 and external guide strips 16, by which another shell 17 is held on the shell 13 so as to be pivotally movable relative thereto. Thus, the shells 13, 17 form an articuated joint, which is movable within a predetermned angular range. A lens mount 19 in longitudinally slidably disposed in a central aperture 18 of the shell 17. A lens 20 indicated only with dash-dot lines is adapted to be secured in said mount.

To enable an adjustment, the mount 19 is provided with external screw threads, which interengage with internal screw threads of a tube 21. To focus the lens, the tube 21 is longitudinally displaceable by a knurled ring 22 and interengaging screw threads of parts 22, 23 as well as guides in a member 24. The forward portion of part 21 forms a lens hood. Part 24 is permanetly connected to shell 17.

Figure 5:
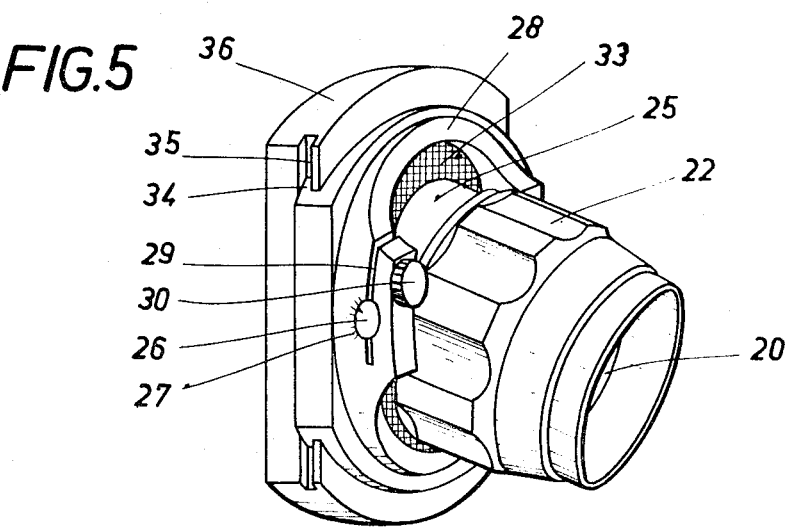
FIG. 5 is a perspective view showing a different mounting according to the invention.
Figure 6:
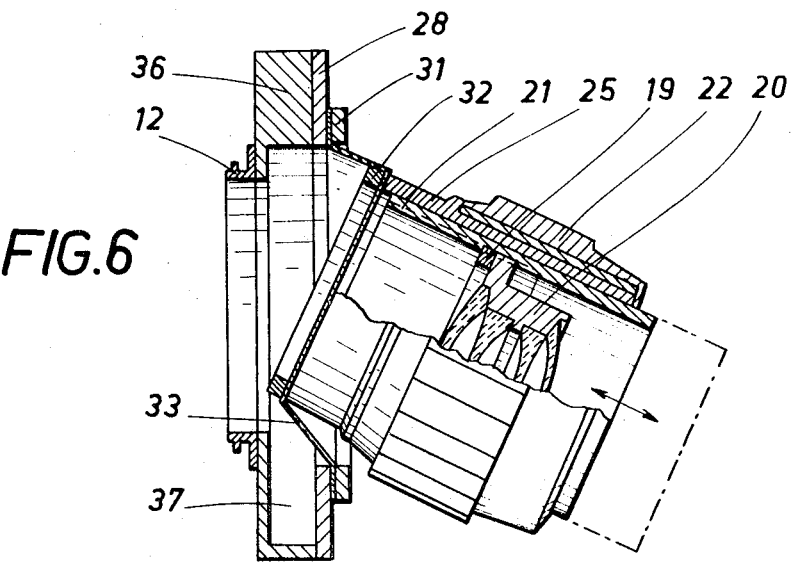
FIGS. 6 and 7 are, respectively, a fragmentary longitudinal sectional view and a sectional view taken through the lens-mounting tube and the pin bearings with the lens in a tilted position.
Figure 7:
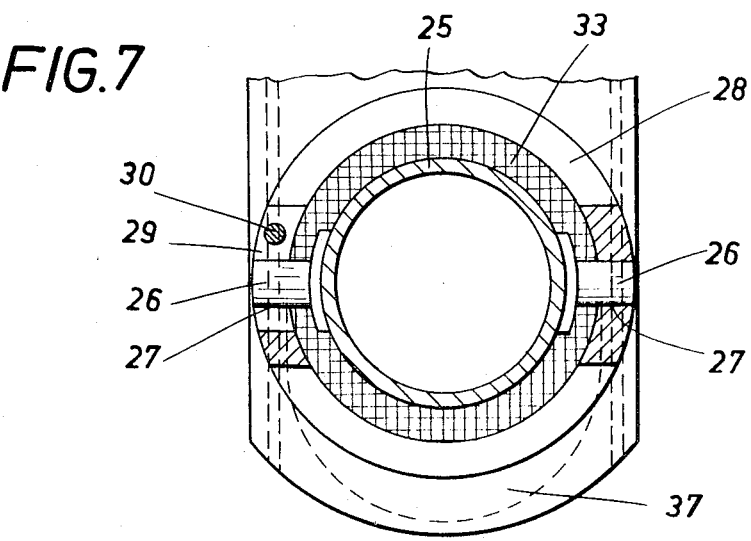

In the embodiment shown in FIGS. 5 to 7, part 25 corresponds to part 24 of the embodiment described hereinbefore and a corresponding device for axially adjusting the lens 20 is also provided. The lens support 25 carries pivot pins 26 on two diametrically opposite sides and with these pins is pivoted in bearing eyes 27 of a retaining ring 28. A vertical slot 29 extends through one bearing eye 27 and can be reduced in width with the aid of a screw 30 to clamp the pin 26 in the bearing eye. Besides, the pin 26 can carry a marking, which cooperates with a scale on the bearing eye to indicate the attitude of the tilted lens. To enable an unobstructed tilting, the inside diameter of the ring 28 exceeds the outside diameter of the tube 25. The annular clearance is lighttightly covered by a resilient diaphragm or sleeve 33, which is secured with clamping rings 31, 32.

The ring 28 is provided with ribs 34 which engage longitudinal grooves 35 in a support 36 that is connected to the connecting ring 12 to enable an adjustment of the ring 28 at right angles to the axis of the aperture. The aperture 37 of the support 36 is elongated to accommodate the desired longitudinal adjustment. This longitudinal adjustment enables, e.g., a re-orientation of the optical axis of the tilted lens to extend through the center of the picture area. The lenses are preferably wide-angle lenses.

What is claimed is:

1. A lens mount for a camera having an image plane comprising
    a lens support,
    an axially adjustable lens in said lens support for focusing along its optical axis,
    a support member having an aperture,
    a connecting ring on said support member to connect said lens support to a camera and for rotation of said lens support about a circle to position said lens in any point of the circle,
    an articulated joint connecting said lens support with said support member opposite said connecting ring,
    said connecting articulated joint enabling angular movement of said lens support relative to said support member to produce angular movement of the optical axis of said lens without affecting the rotative position of said lens about the circle,
    an apertured retainer,
    said articulated joint including said retainer between said lens support and said support member, and
    adjustable means connecting said retainer for planar movement relative to said support member and at right angles to the axis of said support member aperture to displace the optical axis of said lens relative to the image plane.

2. A lens mount for a camera as in claim 1,
    said adjustable connecting means including interengaging elements on said retainer and support member and arranged for relative planar movement at right angles to the axis of said support member aperture,
    said interengaging elements displacing said retainer aperture with respect to said support member aperture,
    and said support member aperture being elongated with respect to the axis of said retainer aperture to accommodate the relative movement of said retainer aperture to provide for the alignment of said apertures at all points of relative displacement of said retainer aperture with respect to said support member aperture.

3. A lens mount for a camera as in claim 1, pivot and bearing means included in said articulated joint and connecting said lens support with said retainer to enable said angular movement of said lens support relative to said support member.

References Cited

UNITED STATES PATENTS

| | | | |
|---|---|---|---|
| 321,139 | 6/1885 | Samuels | 95—50 |
| 1,460,334 | 6/1923 | Bradley | 95—50 |
| 2,177,737 | 10/1939 | Mohr | 95—50 |
| 2,285,768 | 6/1942 | Drucker | 95—50 X |
| 2,335,700 | 11/1943 | Rogers | 95—50 X |
| 3,069,986 | 12/1962 | Oswald | 95—50 X |
| 2,413,272 | 12/1946 | Wheelwright | 95—50 |

FOREIGN PATENTS

| | | |
|---|---|---|
| 214,322 | 8/1907 | Germany. |
| 2,231 | 1913 | Great Britain. |
| 13,674 | 6/1896 | Great Britain. |

SAMUEL S. MATTHEWS, Primary Examiner

M. H. HAYES, Assistant Examiner